(12) United States Patent
Regnard et al.

(10) Patent No.: US 10,578,114 B2
(45) Date of Patent: Mar. 3, 2020

(54) SYSTEM FOR DISCHARGING A COMPRESSOR FLOW OF A TURBINE ENGINE

(71) Applicant: SAFRAN AIRCRAFT ENGINES, Paris (FR)

(72) Inventors: Josselin David Florian Regnard, Moissy-Cramayel (FR); Laurent Louis Robert Baudoin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 105 days.

(21) Appl. No.: 15/781,291

(22) PCT Filed: Dec. 7, 2016

(86) PCT No.: PCT/FR2016/053243
§ 371 (c)(1),
(2) Date: Jun. 4, 2018

(87) PCT Pub. No.: WO2017/098147
PCT Pub. Date: Jun. 15, 2017

(65) Prior Publication Data
US 2018/0355878 A1    Dec. 13, 2018

(30) Foreign Application Priority Data
Dec. 7, 2015    (FR) ...................................... 15 61941

(51) Int. Cl.
*F04D 27/02*    (2006.01)
*F01D 25/30*    (2006.01)
(Continued)

(52) U.S. Cl.
CPC ........... *F04D 27/023* (2013.01); *F01D 25/30* (2013.01); *F02C 9/18* (2013.01); *F04D 29/664* (2013.01);
(Continued)

(58) Field of Classification Search
CPC .......... F01D 25/30; F02C 9/18; F04D 27/023; F04D 29/664; F05D 2250/324;
(Continued)

(56) References Cited

U.S. PATENT DOCUMENTS 5,253,472 A  * 10/1993  Dev ........................ F01D 5/085
                                                                  60/39.43
6,343,672 B1    2/2002  Petela et al.
(Continued)

FOREIGN PATENT DOCUMENTS

FR        3 016 654 A1    1/2014
GB        1166843 A       10/1969

OTHER PUBLICATIONS

International Search Report dated Mar. 14, 2017 in PCT/FR2016/053243 filed Dec. 7, 2016.
(Continued)

*Primary Examiner* — Igor Kershteyn
(74) *Attorney, Agent, or Firm* — Oblon, McClelland, Maier & Neustadt, L.L.P.

(57) ABSTRACT

An assembly including a compressor for a turbine engine, and a discharge system including a supply duct, one end of which is connected to the compressor, the duct being configured to collect therefrom a flow of air compressed by the compressor; and a pressure-reduction device including an inlet and an outlet, the inlet being connected to the other end of the supply duct, wherein the pressure reduction device includes a casing forming a volume between the inlet and the outlet, a porous material occupying the volume, and a device
(Continued)

for holding the porous material within the casing, wherein the outlet has an open section allowing the upper air to pass through the open section of the inlet.

10 Claims, 7 Drawing Sheets

(51) Int. Cl.
*F02C 9/18* (2006.01)
*F04D 29/66* (2006.01)

(52) U.S. Cl.
CPC .... *F05D 2250/324* (2013.01); *F05D 2260/96* (2013.01); *F05D 2270/101* (2013.01); *F05D 2300/514* (2013.01); *Y02T 50/672* (2013.01)

(58) Field of Classification Search
CPC ........... F05D 2260/96; F05D 2270/101; F05D 2300/514; Y02T 50/672
See application file for complete search history.

(56) References Cited

U.S. PATENT DOCUMENTS

| 8,336,316 | B2* | 12/2012 | Kirby | F01D 17/105 60/785 |
| 8,550,208 | B1* | 10/2013 | Potokar | F02K 3/075 181/212 |
| 8,925,330 | B2* | 1/2015 | Britchford | F01D 17/105 415/114 |
| 2003/0080244 | A1* | 5/2003 | Dionne | B64D 33/08 244/57 |
| 2005/0235626 | A1* | 10/2005 | Hull | F02C 7/08 60/39.511 |
| 2005/0235627 | A1* | 10/2005 | Vandermolen | F02C 7/08 60/39.511 |
| 2009/0196739 | A1* | 8/2009 | Tsuchiya | F02C 7/04 415/119 |
| 2010/0043447 | A1 | 2/2010 | Kirby | |
| 2011/0265490 | A1* | 11/2011 | Klasing | F02C 9/18 60/785 |
| 2013/0336759 | A1* | 12/2013 | Christians | F02K 3/10 415/1 |
| 2016/0341067 | A1 | 11/2016 | Benyahia et al. | |

OTHER PUBLICATIONS

French Preliminary Search Report dated Jul. 25, 2016 in Patent Application No. FR 1561941 (with English translation of categories of cited documents).

\* cited by examiner

Primary stream

Secondary stream

Secondary stream

SYSTEM FOR DISCHARGING A COMPRESSOR FLOW OF A TURBINE ENGINE

GENERAL TECHNICAL FIELD

The invention relates to a compressed air discharge system at the level of compressors of turbine engines.

PRIOR ART

A turbine engine conventionally comprises a high-pressure compressor and a low-pressure compressor.

Depending on the operating regime of the turbine engine (for example idle or full throttle), compressors have different operating characteristics.

A need to collect air under pressure and re-inject it downstream after expansion may exist, for example when the turbine engine is in a transient regime or in a stabilized regime, depending on the air collection system. Found for example in a turbofan is a collection system called TBV, for transient bleed valve, which allows the high-pressure compressor for example to be discharged. Another system called HBV, for handling bleed valve, used for example in a turboprop, collects air at the outlet of the high-pressure compressor or the intermediate compressor and discharges the collected air into the primary or secondary stream.

In the case of a TBV, when the turbine engine passes from an idle regime to a full-throttle regime, a flow of compressed air at a high flow rate must be discharged from the compressor, so as to avoid the risk of hunting. This is also the case during transient phases of flight, or during idle phases, or more generally when the pilot is required to manipulate the throttle.

This flow of compressed air to be discharged has, by way of indication on certain turbine engines, a pressure of approximately forty bars and a temperature of approximately nine hundred degrees Kelvin.

In general, as shown in FIG. 1, the air flow is collected at 100 downstream of the high-pressure compressor, but such a collection 100 at high temperature, speed and expansion ratio generate intense levels of noise.

This air flow must therefore be discharged under pressure through a discharge system, and slowed down.

Again by way of example, in a TBV, the static pressure of the fluid collected is comprised between two and eight bars absolute, for a flow rate of 0.6 kg/s. When this flow reaches a perforated grid which imposes a considerable head loss (to bring the flow to atmospheric pressure minus approximately one bar), a supercritical expansion is generated. Thereupon, aerodynamic shocks can be formed in the duct.

The Mach number in particular is an important datum: if it is greater than one at the time of crossing the operating elements, expansion will then be accomplished by means of a shock.

It is imperative that the expansion ratio in the system be less than the critical expansion ratio of the fluid. In particular, if the expansion ratio exceeds the critical expansion ratio of the fluid aerodynamic shocks can form inducing a high acoustic level. Depending on the specific heat ratio γ which depends on the stoichiometric mixture of gases, the critical expansion ratio is calculated by:

$$\pi_{crit} = \left(\frac{2}{\gamma+1}\right)^{\frac{-\gamma}{\gamma-1}}$$

For air, the critical expansion ratio is 1.89.

One solution presented in document FR1450491 proposes to collect compressed air using a duct 2 which is divided into secondary ducts 6, 17 (see FIG. 2, 3a, 3b). Inside the secondary ducts 6, 17 in particular, a diaphragm 15 in the form of a disc 25 comprising an opening 18 (FIG. 3c) or a plurality of openings (FIG. 3d) makes it possible to both cause a head loss and to contribute to the reduction of the speed of flow.

The performance of this diaphragm imposes a certain length to the duct, particular of a zone 30 downstream of the diaphragm, and such a device requires an assembly of piping which can be complex to integrate with the turbine engine.

Another solution, called a "pepper pot," consists of disposing a particular valve at the end of the collecting duct. The pepper pot is formed by a perforated grid situated at the large end of a flare, which makes it possible to both slow the flow and also increase the acoustic spectral content generated by the streaming of the air flow.

In fact, the smaller the diameters of the perforations, the more the spectral content is displaced toward high frequencies. It is thus less perceptible by the human ear.

Performance, however, is not always satisfactory.

PRESENTATION OF THE INVENTION

In order to mitigate the disadvantages of the prior art, the invention proposes an assembly comprising a turbine engine compressor and a discharge system comprising:
- a conveying duct of which one end is connected at the level of the compressor, the duct being configured to collect from it an air flow compressed by the compressor,
- an expansion device comprising an inlet and an outlet, the inlet being connected at another end of the conveying duct, characterized in that said expansion device comprises:
    - A casing forming a volume between the inlet and the outlet,
    - A porous material occupying the volume,
    - Means for retaining the porous material within said casing, in which the outlet has an open cross-section allowing air passage greater than the open cross-section of the inlet and in which the porous material is a metal mesh, or a ceramic mesh, or a composite material mesh.

Thanks to the porous material and the increase in the open cross-section, the air flow is slowed and discharged better, without creating an acoustic shock. Such an assembly allows better integration into a turbine engine, particularly because the compactness of the device is improved.

The invention can also comprise the following features, taken alone or on combination:
- the discharge system is configured so that the Mach number of the flow within the expansion device is less than 0.9,
- the casing has a divergent flare from the inlet to the outlet,
- the retention means comprise a first perforated grid disposed at the inlet and a second perforated grid at the outlet, the porous material being situated between the two grids and retained inside the casing by the two grids,
- the surface density of the perforations of the grids is identical for the two grids,
- the distribution of the perforations is homogeneous on each of the grids,
- the "pepper pot" type outlet leads into open air.

The invention proposes a turbine engine comprising an assembly as previously described, wherein the compressor is a high-pressure compressor and the duct collects air compressed by the compressor in the primary stream.

The turbine engine can also comprise a plurality of discharge systems as described previously, wherein the conveying ducts of said discharge systems join and share the end connected to the high-pressure compressor. Thus, in the air flow direction, collection is divided into several ducts and its speed decreases.

In addition, the discharge system can be configured to turn away the flow collected into the secondary stream of the turbine engine.

The turbine engine can also additionally comprise a low-pressure turbine and a case situated at the outlet of the low-pressure turbine, called the TRV (turbine rear vane) case, the turbine and the case being disposed successively downstream of the high-pressure compressor. In said turbine engine, the discharge system is in fluid communication with the primary stream at the outlet case of the low-pressure turbine.

Finally, the invention proposes a method for dimensioning an air discharge system of a compressor of a turbine engine as presented previously, in which said air discharge system is adapted so that the Mach number of the air flow passing through the device is less than 0.9.

PRESENTATION OF THE FIGURES

Other features, aims and advantages of the invention will be revealed by the description that follows, which is purely illustrative and not limiting, and which must be read with reference to the appended drawings, in which.

DETAILED DESCRIPTION

The invention will be described in detail in the context of a TBV on a turbine engine, but applies to any system for collecting compressed air at the level of a compressor 38 of a turbine engine 1. By "at the level of" is meant "just downstream" of the compressor, where the air flow is at the outlet pressure of the compressor.

Figure 1:
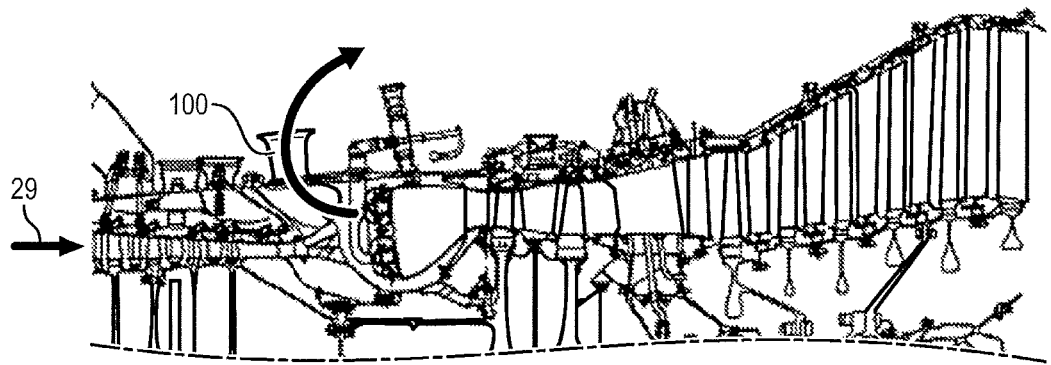
FIG. 1 is a representation of a turbine engine of the prior art.
Figure 2:
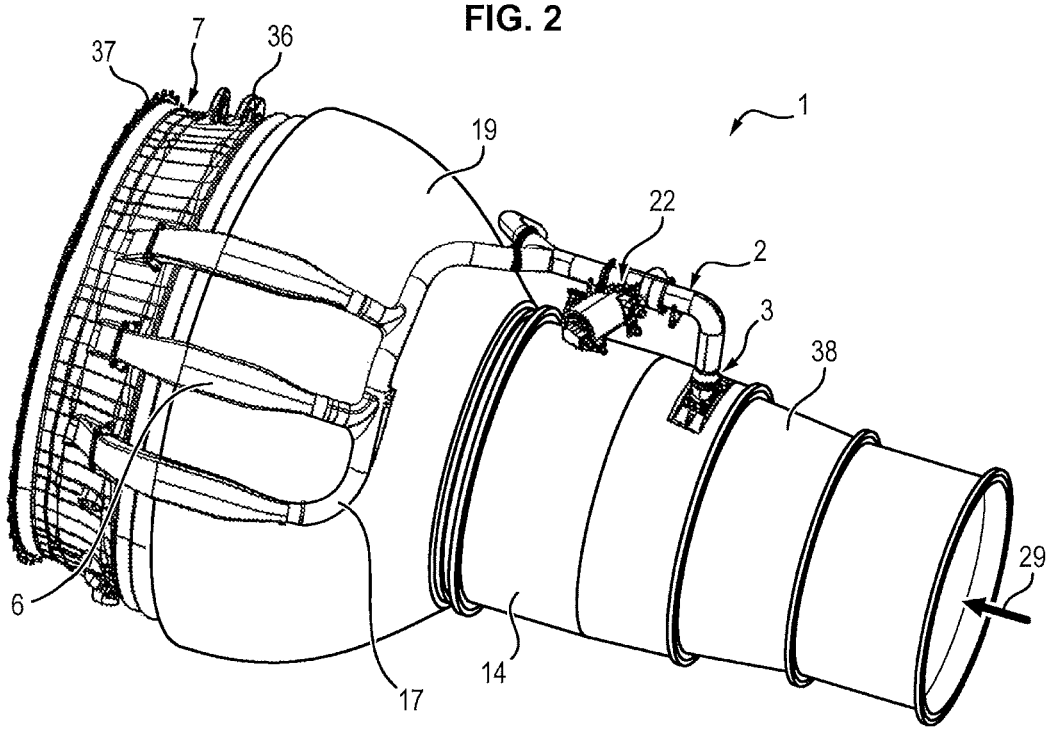
FIG. 2 is a representation of a portion of the turbine engine comprising the invention, according to one embodiment of the turbine engine.

As illustrated in FIG. 2, the double flow turbine engine 1 conventionally comprises, in the air flow 29 circulation direction, a high-pressure compressor 38 and a high-pressure turbine 14 and a low-pressure turbine 19. The streaming direction of the air flow passing through the turbine engine 1 is shown by an arrow 29 in FIGS. 1 and 2.

The turbine engine 1 comprises a primary stream which passes through the turbines 14, 19 and the high-pressure compressor 38 and comprises a secondary stream, situated radially around the primary stream.

The roles and functions of these streams in the context of a turbine engine will not be detailed here but are well known to a person skilled in the art.

The turbine engine 1 also comprises a case 7, disposed at the outlet of the low-pressure turbine 19. This case 7 is designated by the expression "turbine rear vane" by a person skilled in the art. This TRV case 7 is conventionally disposed before the ejection nozzle. It serves in particular for retaining the structure of the turbine engine.

Figure 3A:
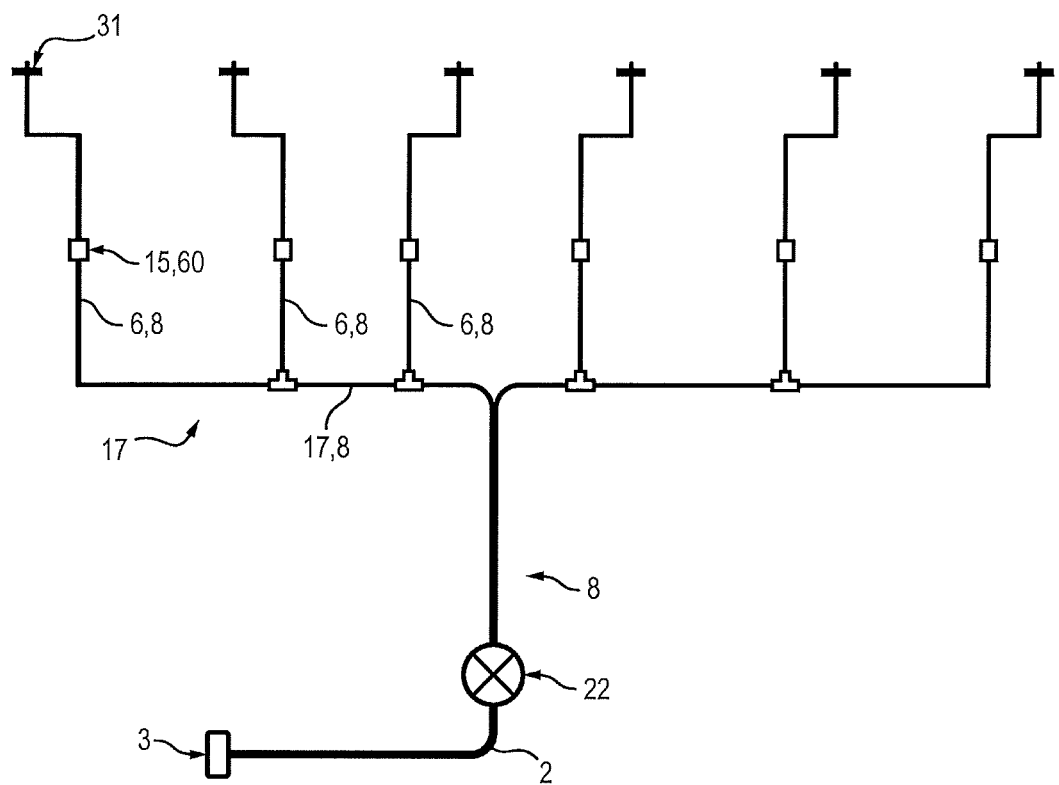
FIG. 3a shows a duct terminated by secondary ducts each comprising a discharge system according to the invention.
Figure 3B:
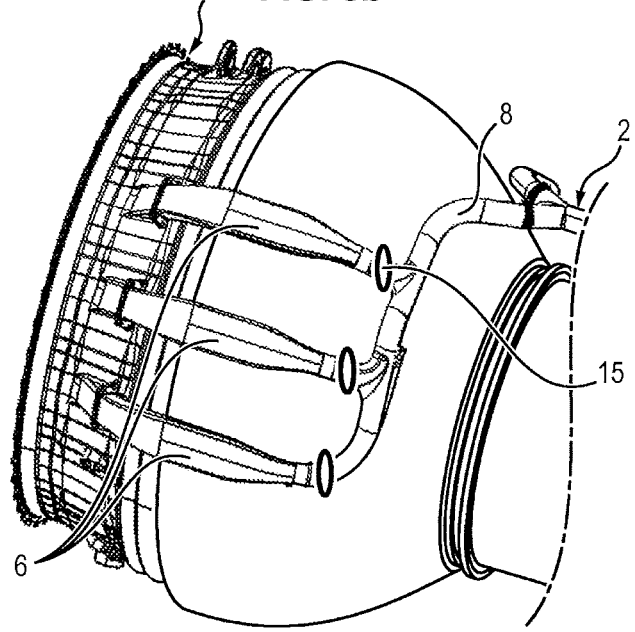
FIG. 3b shows the duct terminated by secondary ducts leading into an outlet case of a low-pressure turbine of the turbine engine.
Figure 3C:
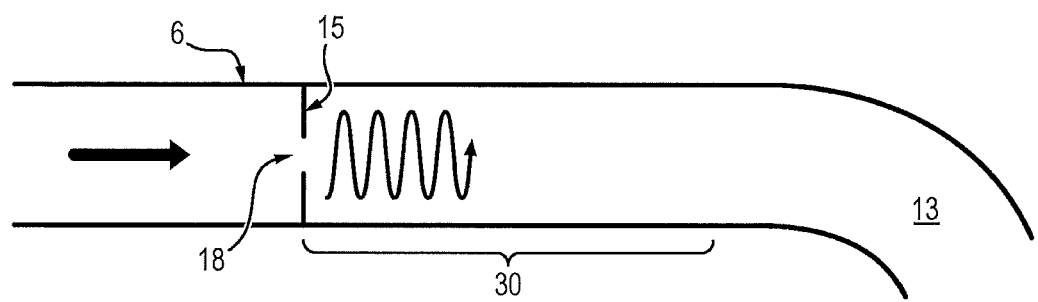
FIGS. 3c and 3d show a diaphragm existing in the prior art.
Figure 3D:
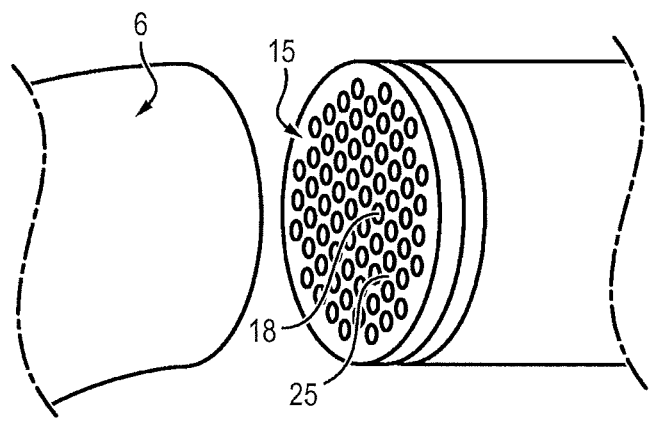
Figure 4:
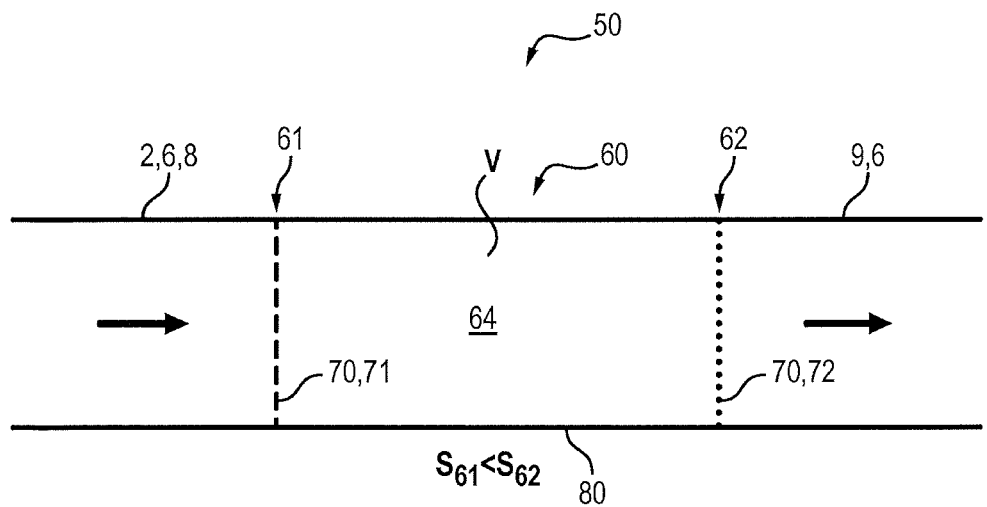
FIGS. 4 and 5 show two embodiments of the invention.
Figure 5:
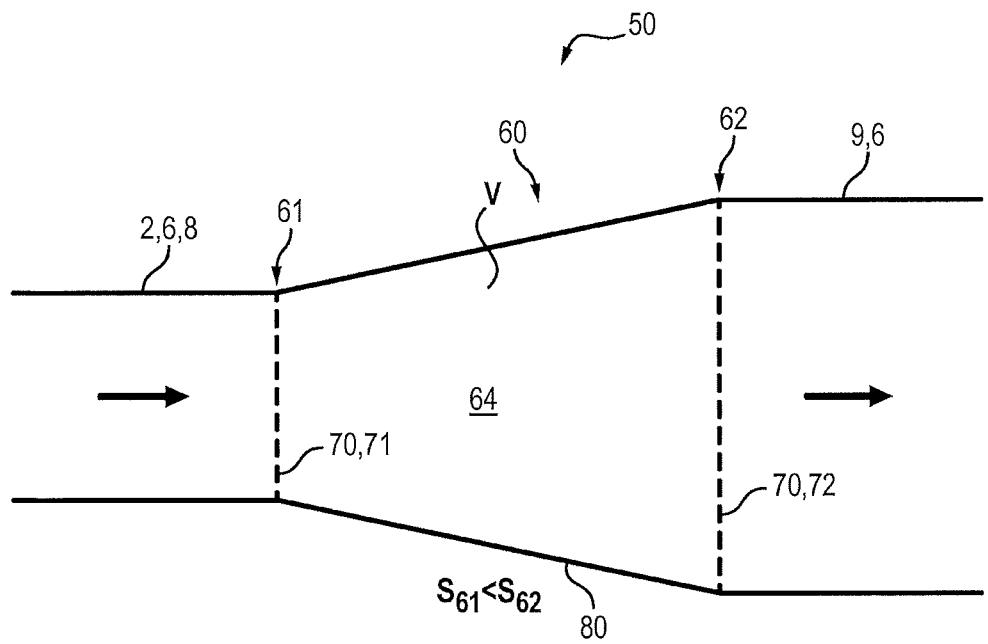

As illustrated in FIG. 3b, the TRV case 7 is substantially a figure of revolution. It comprises a plurality of axial structural arms, the space separating the arms defining openings.

The turbine engine 1 comprises a discharge system 50, the function of which is to collect an air flow under pressure at the compressor 38 to slow it down and expand it and then deliver it to another area of the turbine engine.

Referring to FIGS. 3a, 3b, 4 and 5, the discharge system 50 comprises a conveying duct 8 of which one end is connected to the compressor 38.

Either directly or after subdivision (which will be detailed hereafter), this conveying duct 8 is connected to an expansion device 60 allowing the air to be slowed down and reduced in pressure. The air penetrates into the expansion device 60 by an inlet 61 and leaves it by an outlet 62. The expansion device 60 comprises a casing 80 which allows defining a volume V with inlet 61 and outlet 62.

Preferably, the casing 80 is a figure of revolution to retain the effects of symmetry. This symmetry allows a reduction in the structural forces on the ductwork, simplicity of assembly and of manufacture. Symmetry is also obtained in the flow: the entire volume is used for this flow; it is therefore an optimum configuration from the point of view of mass/effectiveness.

In one alternative, it is also possible to have a non-axisymmetric casing to resolve possible problems of bulk in the integration of the discharge system.

Said volume V is occupied by a porous material 64 allowing the air flow to pass through it while slowing down and while undergoing a progressive head loss.

The porous material 64 is in particular defined by its porosity, its tortuosity and its density. Such a material allows high-performance acoustic masking and creates sufficiently progressive expansive to limit any shock.

In a preferred embodiment, the porous material is a metal mesh, that is a sort of metallic sponge, made of stainless steel for example.

In another embodiment, the porous material is made of ceramic or of composite material.

Depending on the identified need, a person skilled in the art will select among the most suitable material.

The use of a volume assembly, instead of a diaphragm as described in the introduction, which was a surface means, improves the progressivity of the expansion while avoiding adding noise due to discontinuous expansion.

In addition, the open surface area $S_{62}$ of the expansion device 60 at the outlet 62 is greater than the open surface area $S_{61}$ of the expansion device at the inlet 61. The open surface area is defined as the surface area that an air flow effectively passes through, during operation. For a given cross-section, the open surface area is necessarily less than the area of said cross-section.

The expansion device 60 thus has several functions:
Creating a continuous head loss thanks to the volume V of porous material 64, Homogenizing and stabilizing the flow,
Allowing rapid diffusion between the inlet 61 and the outlet 62.

This therefore allows a significant reduction in noise downstream of the expansion device 60.

Advantageously, the expansion device 60 allows the upstream noise transmitted downstream to be masked thanks to the reduced size of the ducts.

Retention means 70 allows the porous material 70 to be retained inside the casing 80, between the inlet 61 and the outlet 62. There are several ways to accomplish these retention means 70: glue, deformation of the casing 80, abutments...

One preferred embodiment consists of using a first grid 71 positioned in the inlet 61 of the expansion device 60 and a second grid 72 positioned at the outlet 62 of the expansion device 60.

These grids 71, 72, which are perforated and allow the passage of the air flow, also contribute to the head loss.

There are several types of grid. A perforation density D is defined, which corresponds to the ratio of the open surface area (the passing surface area) to the total surface area of the grid.

For this purpose there exist several possible types of development to satisfy the criterion of increasing the open surface area between the inlet and the outlet, said modes possibly being complementary.

If the retention means 70 do not modify the open surface areas S61, S62 of the inlets/outlets 61, 62, then the cross-section of the casing 80 increases from the inlet 61 to the outlet 62, i.e. the casing 80 defines a divergent flare (see FIG. 5) in the downstream direction. The casing 80 then has the shape of a truncated cone, upstream and downstream.

In the case where the retention means 70 are grids 71, 72 defined previously, then the open surface area $S_{61}$ of the first grid 71 is greater than the open surface area $S_{62}$ of the second grid 72. There are several ways to accomplish this:
   Either the casing 80 has a flare (thus downstream) (see FIG. 5), in which case the increase in the surface area can arise from the fact that the total surface area of the grid increases (at a constant perforation density D),
   Or there is no flare (see FIG. 4), in which case the increase in the surface area arises from the fact that the perforation density D of the second grid 72 is greater than that of the first 71.

The porous material 68 limits the noise created by the turbulence of the first grid 71 impacting the second grid 72.

It should be noted that it is possible to have a greater surface density D of perforations in the second grid 72 than in the first grid (71) even in the case of a flare.

In order to limit the effects of an acoustic shock, the discharge system 50 is configured so that the Mach number of the flow in the expansion device 60 is strictly less than 0.90. In other words, the Mach number of the flow passing the open cross-section $S_{61}$ of the inlet 61 and the open cross-section $S_{62}$ of the outlet 62 is strictly less than 0.9.

Advantageously, the open surface area of the grids ensures a Mach number less than 0.9.

In fact, the Mach characteristic imposes conditions on the discharge system 50 and the expansion device 60, as in particular a minimum value for the open cross-section of the expansion device 60.

Figure 6:
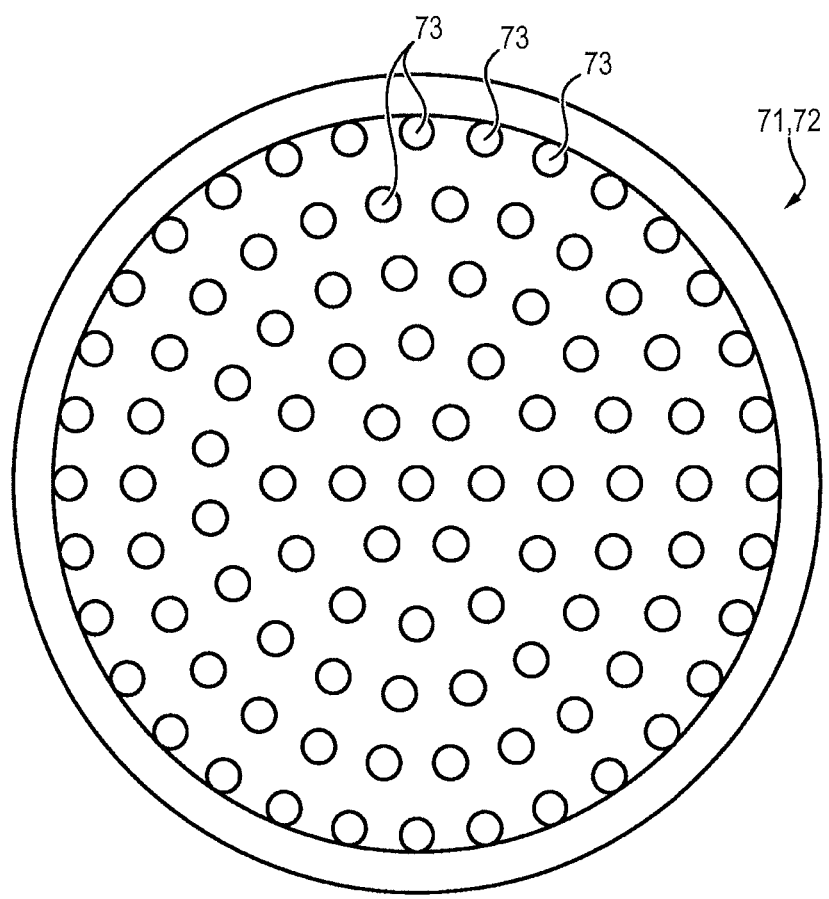
FIG. 6 shows a disk which can be situated at the inlet or at the outlet of the invention, according to one embodiment.

In a particular embodiment shown in FIG. 6, the distribution of perforations 73 is homogeneous.

In one embodiment, which can be combined with the preceding embodiments, the diameter of the perforations 73 is preferably less than 5 mm.

In one embodiment, the porous material 64 has constant physical characteristics in its entire volume.

In one advantageous embodiment, the porous material 64 has a decreasing (or increasing, respectively) gradient of porosity (or of density, respectively) from the inlet 61 to the outlet 62. In other words, the material is more porous (less dense respectively) at the inlet 61 than at the outlet 62. As the speed of the flow decreases through the expansion device 60, the gradient allows retaining a constant expansion ratio per unit of length through the expansion device 60.

Figure 7A:
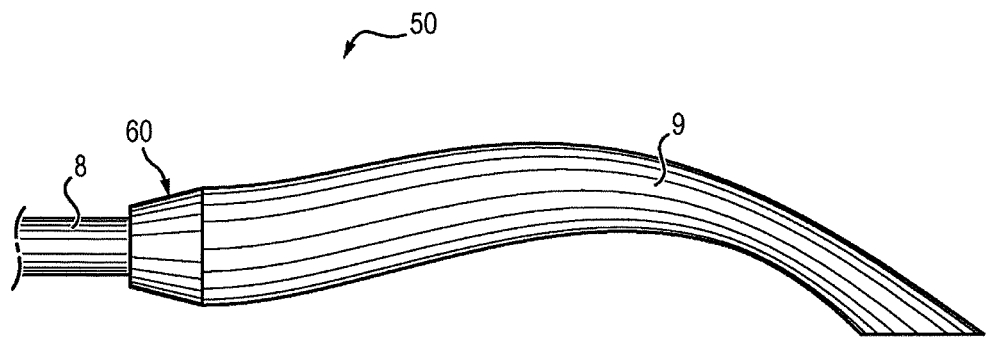
FIGS. 7a, 7b, 7c, 8a, 8b show different embodiments of the invention.
Figure 7B:
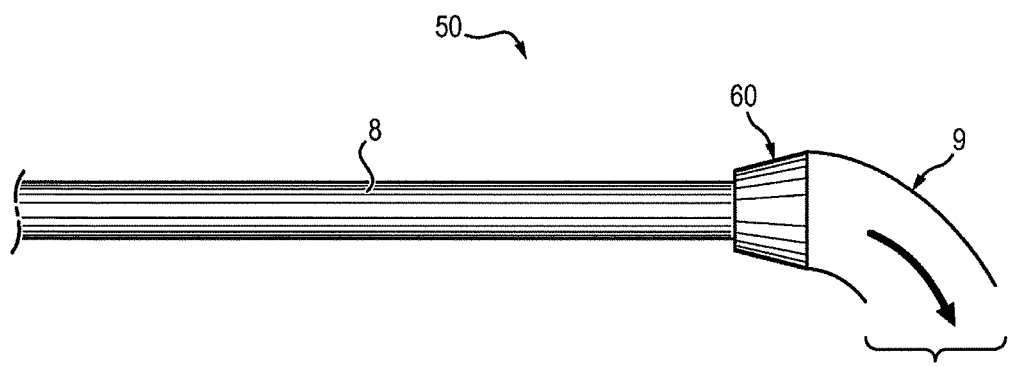
Figure 8A:
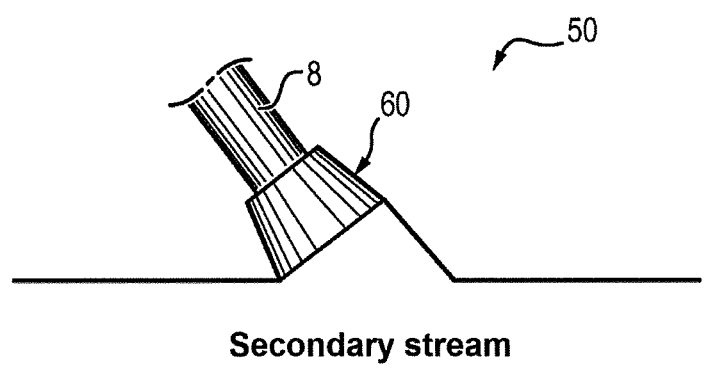
Figure 8B:
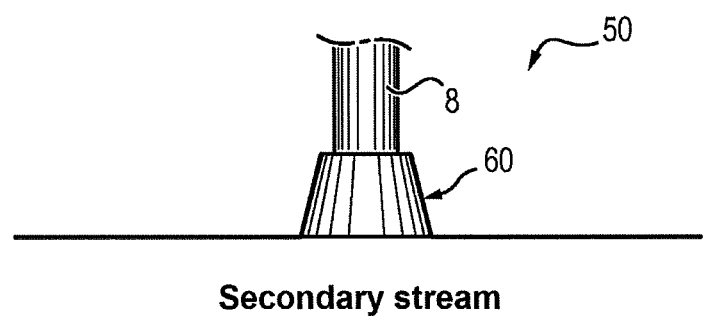

The discharge systems 50 can release the flow in several ways. A first consists of connecting the outlet of the expansion device 60 to another duct, called the release duct 9, and this duct will spill the flow at a particular location (FIGS. 7a, 7b). A second consists of having an expansion device 60 which operates like a pepperpot, i.e. the outlet 62 is free (FIGS. 8a, 8b). In this case and when the retention means 70 comprise the second grid 72, it is possible to provide that the second grid 72 has a shape that is cambered toward the exterior of the expansion device 60, to favor dispersion.

Figure 7C:
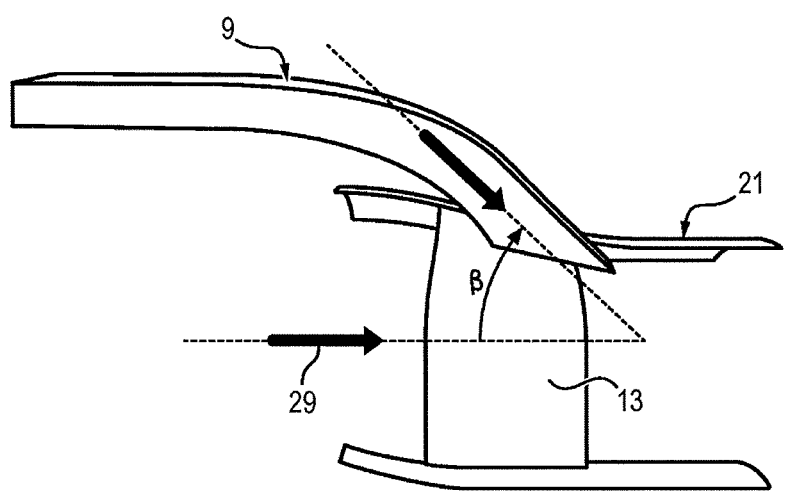

The releasing of the flow can occur at a particular angle β with a longitudinal direction of the turbine engine 1 to avoid turbulence (see FIG. 7c).

It can also be necessary to have several expansion devices 60. To this end, several conveying ducts 8 can be disposed so as to join at one end which collects the air flow at the compressor 38. This subdivision (which will be detailed in the context of the TBV) allows a reduction in the speed of the air flow.

At present, the integration of such a device into a TBV will be described (FIGS. 2, 3b, 7c).

The duct 2 as shown in FIG. 2 also comprises a valve 22 allowing control of the flow rate of the air flow collected by the duct 2, which is serves as a conveying duct 8. The opening and the closing of this valve 22 are conventionally controlled by the computer of the aircraft, depending on the pilot's instructions. This valve 22 is conventionally called TBV, for transient bleed valve, by a person skilled in the art.

In the embodiment illustrated in the figures, the duct 2 is terminated at its other end by a plurality of secondary ducts 6, the secondary ducts 6 begin connected to openings 13 of the TRV case 7, to discharge there the collected air flow.

According to a possible embodiment, the other end of the duct 2 is terminated by at least two distinct branches 17 each bearing a portion of the secondary ducts 6. In the example, each branch 17 carries three secondary ducts 6.

According to one embodiment, the end 31 of the secondary ducts 6 pass through the external collar 21 of the TRV case 7 to spill the collected air flow into the openings 13 (see FIGS. 2, 3b and 7c). To this end, holes can be provided in the external collar 21 to allow passage of the end of the secondary duct 6. The expanded air flow is thus discharged into the primary stream.

The turbine engine 1 comprises, in each secondary duct 6, an expansion device 60. In this embodiment, the secondary duct 6, originating in a subdivision of the duct 2, serves as a conveying duct 8 and a release duct 9.

The position of the expansion devices 60 influences the Mach number at the outlet of the secondary ducts 6.

It is desirable that the collected air flow retains a high pressure in the ducts 2, 6 (upstream of the expansion device 60) over the greatest distance possible, because this high pressure makes it possible to maintain a small diameter of the ducts 2, 6. It is therefore desirable to be able to disposed the expansion devices 60 as far downstream as possible from the ducts 6, so as to maximize the length over which the duct 2 and the secondary ducts 6 have a small diameter, for example with a value less than 3 inches (see FIG. 7b versus 7a). Thanks to the aerodynamic and acoustic properties of the expansion device 60, this is allowed.

According to one embodiment, illustrated in FIG. 7a, 7b, 7c the release ducts 9 have, at their ends connected to the openings 13, an angle β with the longitudinal axis of the turbine engine less than 45°. This makes it possible to impose that the collected air flow introduced into the openings 13 has an angle β less than 45° with the primary flow 29 circulating in the openings 13 of the turbine engine. Preferably, the angle β is less than 35°.

Alternatively, because the expansion device 60 allows effective expansion of the air flow while respecting acoustic constraints, it is possible to discharge, not into the primary stream but into the secondary stream, situated radially outside the primary stream.

Such an architecture allows shortening ducts to be mounted and facilitates integration.

In this embodiment, it is possible to dispose the expansion device 60 in a pepperpot type configuration (see FIGS. 8a, 8b).

The invention also applies to HBV valves. The HBVs can be integrated into a turboprop and, in this case, the air is ejected outside the turbine engine. When an HBV is integrated in a turbofan, the ejection of air occurs in the secondary stream. The principle is to eject air into the exterior stream closest to the point of collection (accomplished in the primary stream) so as to minimize the length of ductwork. An air flow, channeled or not, passing through the engine from one end to the other is called a stream.

Finally, the invention proposes a method for discharging air at a compressor 38. During this discharge, the Mach number of the air which passes through the device 60 is less than 0.9.

The invention claimed is:

1. An assembly comprising a turbine engine compressor and a compressor discharge system comprising:
   a conveying duct of which one end is connected at a level of the compressor, the conveying duct being configured to collect an air flow compressed by the compressor,
   an expansion device comprising an inlet and an outlet, the inlet being connected at another end of the conveying duct, wherein said expansion device comprises:
   a casing forming a volume between the inlet and the outlet,
   a porous material occupying the volume,
   means for retaining the porous material within said casing, wherein the outlet has an open cross-section allowing air passage, greater than an open cross-section of the inlet, wherein the porous material is a metal mesh, or a ceramic mesh, or a composite material mesh.

2. The assembly according to claim 1, wherein the discharge system is configured so that a Mach number of air flow within the expansion device is less than 0.9.

3. The assembly according to claim 1, wherein the casing has a divergent flare from the inlet to the outlet.

4. The assembly according to claim 1, wherein the means for retaining comprise a first perforated grid disposed at the inlet and a second perforated grid at the outlet, the porous material being situated between the two grids and retained inside the casing by the two grids.

5. The assembly according to claim 3, wherein a surface density of perforations of the two grids is identical for the two grids and/or a distribution of the perforations is homogeneous on each of the grids.

6. A turbine engine comprising an assembly according to claim 1, wherein the compressor is a high-pressure compressor and the conveying duct collects air compressed by the high-pressure compressor is a stream called a primary stream of the turbine engine.

7. The turbine engine according to claim 6, comprising a plurality of air discharge systems each comprising a conveying duct and an expansion device, wherein the conveying ducts join and share the end connected to the high-pressure compressor.

8. The turbine engine according to claim 6, wherein the discharge system is configured to turn away the flow collected into a stream, called a secondary stream, of the turbine engine.

9. The turbine engine according to claim 6, also comprising a low-pressure turbine and an outlet case of the low-pressure turbine disposed successively downstream of the high-pressure compressor wherein the discharge system is in fluid communication with the primary stream at the outlet case of the low-pressure turbine of the turbine engine.

10. A method for dimensioning an assembly according to claim 1, wherein said compressor discharge system is adapted so that a Mach number of air flow passing through the expansion device is less than 0.9.

* * * * *